United States Patent
Darms et al.

(10) Patent No.: US 10,940,861 B2
(45) Date of Patent: *Mar. 9, 2021

(54) METHOD AND SYSTEM FOR AUTOMATICALLY CONTROLLING A FOLLOWING VEHICLE WITH A FRONT VEHICLE

(71) Applicant: VOLKSWAGEN AG, Wolfsburg (DE)

(72) Inventors: Michael Darms, Lehre (DE); Marc-Michael Meinecke, Sassenburg (DE); Arne Bartels, Wolfsburg (DE); Lutz Junge, Braunschweig (DE)

(73) Assignee: Volkswagen AG

( * ) Notice: Subject to any disclaimer, the term of this patent is extended or adjusted under 35 U.S.C. 154(b) by 153 days.

This patent is subject to a terminal disclaimer.

(21) Appl. No.: 15/377,361

(22) Filed: Dec. 13, 2016

(65) Prior Publication Data

US 2017/0166207 A1  Jun. 15, 2017

(30) Foreign Application Priority Data

Dec. 15, 2015  (DE) ...................... 10 2015 225 241.8

(51) Int. Cl.
*B60W 30/165* (2020.01)
*G05D 1/02* (2020.01)
(Continued)

(52) U.S. Cl.
CPC ........ *B60W 30/165* (2013.01); *B60W 30/095* (2013.01); *G05D 1/0212* (2013.01);
(Continued)

(58) Field of Classification Search
CPC ............. B60W 30/165; B60W 30/095; B60W 2050/0077; B60W 2550/308; B60W 2550/408; G05D 1/0212; G05D 1/0295
See application file for complete search history.

(56) References Cited

U.S. PATENT DOCUMENTS 5,909,189 A * 6/1999 Blackman ............. G01S 13/726
                                                             342/90
6,320,515 B1 * 11/2001 Olsson ................... G08G 1/075
                                                             340/905
(Continued)

FOREIGN PATENT DOCUMENTS

DE   102005059517 A1     6/2007
DE   102009050503 A1 * 11/2010  ............. G08G 1/167
(Continued)

OTHER PUBLICATIONS

Search Report for European Patent Application No. 16199167.4; dated Apr. 19, 2017.

*Primary Examiner* — Thomas E Worden

(74) *Attorney, Agent, or Firm* — Barnes & Thornburg, LLP

(57) ABSTRACT

A method for automatically controlling a following vehicle. A leading vehicle is guided along an actual trajectory, and a desired trajectory is produced for the following vehicle. The actual trajectory of the leading vehicle is captured by the following vehicle, and a trajectory similarity is determined by comparing the captured actual trajectory of the leading vehicle and the produced desired trajectory of the following vehicle. Automatic control of the following vehicle along the desired trajectory is activated if the trajectory similarity exceeds a particular value. Also disclosed is a system for automatically controlling a following vehicle using a leading vehicle.

16 Claims, 2 Drawing Sheets

(51) Int. Cl.
  *B60W 30/095* (2012.01)
  *B60W 50/00* (2006.01)
(52) U.S. Cl.
  CPC ... *G05D 1/0295* (2013.01); *B60W 2050/0077* (2013.01); *B60W 2554/801* (2020.02); *B60W 2556/65* (2020.02)

(56) References Cited

U.S. PATENT DOCUMENTS

| | | | | |
|---|---|---|---|---|
| 8,792,905 | B1 * | 7/2014 | Li | H04W 4/029 |
| | | | | 455/456.1 |
| 9,645,579 | B2 * | 5/2017 | Switkes | G08G 1/22 |
| 2003/0085066 | A1 * | 5/2003 | Labuhn | B60K 31/0008 |
| | | | | 180/167 |
| 2006/0229793 | A1 | 10/2006 | Sawamoto et al. | |
| 2008/0059007 | A1 * | 3/2008 | Whittaker | G08G 1/22 |
| | | | | 701/2 |
| 2008/0186210 | A1 * | 8/2008 | Tseng | G01C 21/3602 |
| | | | | 340/995.26 |
| 2010/0104199 | A1 * | 4/2010 | Zhang | G08G 1/165 |
| | | | | 338/199 |
| 2010/0256836 | A1 * | 10/2010 | Mudalige | G08G 1/163 |
| | | | | 701/2 |
| 2010/0256852 | A1 * | 10/2010 | Mudalige | G08G 1/22 |
| | | | | 701/24 |
| 2012/0022739 | A1 | 1/2012 | Zeng | |
| 2013/0131925 | A1 * | 5/2013 | Isaji | B62D 6/00 |
| | | | | 701/41 |
| 2013/0218365 | A1 * | 8/2013 | Caveney | G05D 1/0295 |
| | | | | 701/1 |
| 2014/0303870 | A1 * | 10/2014 | Switkes | G08G 1/166 |
| | | | | 701/96 |
| 2014/0309836 | A1 * | 10/2014 | Ollis | G08G 1/22 |
| | | | | 701/25 |
| 2015/0015384 | A1 * | 1/2015 | Shima | B60W 30/95 |
| | | | | 340/435 |
| 2015/0032369 | A1 * | 1/2015 | Schmidt | G05D 1/0295 |
| | | | | 701/467 |
| 2015/0127189 | A1 * | 5/2015 | Mehr | B60W 30/165 |
| | | | | 701/1 |
| 2015/0177007 | A1 | 6/2015 | Su et al. | |
| 2015/0344027 | A1 * | 12/2015 | Oooka | B60W 30/00 |
| | | | | 701/408 |
| 2015/0375744 | A1 * | 12/2015 | Kato | B60W 30/16 |
| | | | | 701/96 |
| 2016/0071418 | A1 * | 3/2016 | Oshida | B60W 30/165 |
| | | | | 701/23 |
| 2016/0214647 | A1 * | 7/2016 | Weisswange | G06K 9/00791 |
| 2016/0347181 | A1 * | 12/2016 | Yamakado | B60L 3/0015 |
| 2017/0168503 | A1 * | 6/2017 | Amla | G05D 1/0011 |
| 2017/0309187 | A1 * | 10/2017 | Lin | B60W 30/16 |
| 2017/0364080 | A1 * | 12/2017 | Chintakindi | B60W 50/082 |
| 2018/0015923 | A1 * | 1/2018 | Kurumisawa | G08G 1/056 |
| 2020/0033886 | A1 * | 1/2020 | Meinecke | G05D 1/0242 |

FOREIGN PATENT DOCUMENTS

| | | | | |
|---|---|---|---|---|
| DE | 102010013647 | A1 * | 2/2011 | ............ G08G 1/22 |
| DE | 102012212681 | A1 | 1/2013 | |
| DE | 102012208256 | A1 * | 11/2013 | ........... G05D 1/0295 |
| DE | 102012208256 | A1 | 11/2013 | |
| DE | 102013212255 | A1 | 12/2014 | |
| DE | 102013225011 | A1 | 6/2015 | |
| DE | 102014200804 | A1 | 7/2015 | |
| DE | 102015213743 | A1 * | 1/2017 | ....... G08G 1/096811 |
| EP | 0991046 | A1 | 4/2000 | |
| EP | 3048023 | B1 * | 11/2018 | ........... B60W 40/06 |
| GB | 2511750 | A | 9/2014 | |

* cited by examiner

METHOD AND SYSTEM FOR AUTOMATICALLY CONTROLLING A FOLLOWING VEHICLE WITH A FRONT VEHICLE

PRIORITY CLAIM

This patent application claims priority to German Patent Application No. 10 2015 225 241.8, filed 15 Dec. 2015, the disclosure of which is incorporated herein by reference in its entirety.

SUMMARY

Illustrative embodiments relate to a method for automatically controlling a following vehicle. Illustrative embodiments also relate to a system for automatically controlling a following vehicle using a leading vehicle.

BRIEF DESCRIPTION OF THE DRAWINGS

Disclosed embodiments are now explained with reference to the drawings.

DETAILED DESCRIPTION

Figure 1:
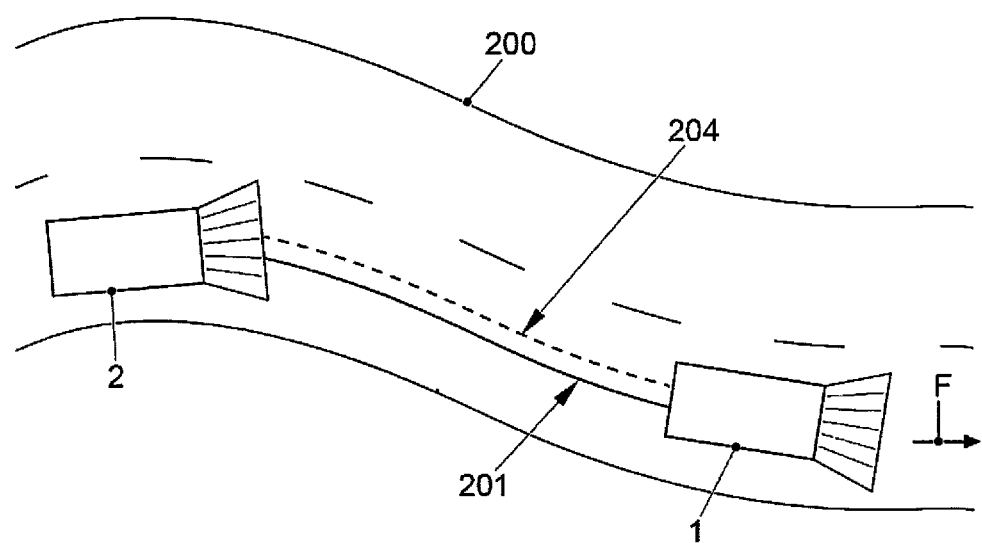
FIG. 1 shows a leading vehicle and a following vehicle on a route section.

To increase the efficiency and safety in traffic and in logistics, in particular when transporting goods, or else when transporting persons, the aim is to extensively automate vehicles. For this purpose, techniques are already known which relieve pressure on the driver by means of automatic interventions in the control of a vehicle at various levels or carry out individual driving maneuvers in a fully automatic manner. This extends to remote control or to the autonomous driving of a route by a vehicle.

DE 10 2005 059 517 A1 describes such a system for guiding and operating a vehicle without a driver, data being forwarded from sensors of the vehicle to an operations center and operating data for controlling the vehicle being transmitted from the operations center to the vehicle. In this case, data transmission between the vehicle and the operations center in near real time is assumed and a time delay which possibly occurs is technically compensated for.

In the method described in DE 10 2013 212 255 A1, a first vehicle uses a sensor system to check a space relative to the first vehicle and transmits the result of the check to a second vehicle. As a result, the second vehicle can be informed, for example, of whether a space in the environment of the first vehicle is free and whether it is possible to move back into a lane.

In the method described in DE 10 2013 225 011 A1, in a motor vehicle traveling in a highly automated manner, the motor vehicle's own position is compared with external data relating to a current traffic situation and a decision is made with regard to whether it is necessary to change the driving state. It is detected whether the vehicle is traveling toward an obstacle or a route section which otherwise cannot be automatically driven on. This may result in the automated journey being aborted, for instance. For example, it is possible to process a blockage of a route section in front of the vehicle for the automated journey or a traffic jam message can be used to abort the highly automated journey in good time.

DE 10 2012 212 681 A1 describes a method for autonomously guiding vehicles. In this case, a following vehicle receives a target position relative to a guiding vehicle as well as route data relating to the route driven on by the guiding vehicle. The distance covered by the guiding vehicle is also captured by on-board capture apparatuses of the following vehicle and tracking data are derived on the basis of these data. An accuracy is determined by comparing the route data and the tracking data. The following vehicle is then autonomously controlled to the target position relative to the guiding vehicle on the basis of the accuracy.

DE 10 2012 208 256 A1 also describes a method for autonomously tracking a following vehicle in the lane of a guiding vehicle, in which the guiding vehicle transmits route information and first coordinate information to the following vehicle. Environmental sensors of the following vehicle capture driving movements of the guiding vehicle and second coordinate information is produced on the basis of this information. The first and second items of coordinate information are compared and autonomous tracking is carried out if the items of information match.

A central prerequisite for the safe operation of such systems is a high degree of redundancy in the safety precautions used. Typically, the automatic performance of a driving maneuver presupposes the presence of a driver who monitors the movement of the vehicle and can carry out corrective interventions. This prevents malfunctions of the system, for instance in the case of defective sensors or in unusual traffic situations. In this case, completely automatic driving is therefore not implemented, but rather assisted driving. In this case, the degree of automation is adapted to the technical design of the system, in particular the redundancies provided.

If the system is intended to be operated in a fully automatic manner, that is to say without a driver being provided for each vehicle, high degrees of redundancy must be provided at the technical level. This is achieved, for instance, by installing a multiplicity of sensors—some of which have multiple configurations—in the vehicle. However, the possibilities of integrating sensors in a vehicle are spatially restricted in this case and considerable additional costs may also arise.

Reliable, permanent communication between the automatically guided vehicle and other devices is also provided in the systems described above. In this manner, the vehicle's own sensors and control systems are assisted by means of information from the outside. However, this permanent communication cannot be guaranteed in every situation, for instance if the communication infrastructure is incomplete or has failures.

Disclosed embodiments provide a method and a system of the type mentioned at the outset in which control which has a high degree of automation is achieved, the automatic guided vehicle being controlled in a largely independent manner.

In the method of the type mentioned at the outset, a leading vehicle is guided along an actual trajectory. A desired trajectory is produced for the following vehicle and the actual trajectory of the leading vehicle is captured by the following vehicle. A trajectory similarity is determined by comparing the captured actual trajectory of the leading vehicle and the produced desired trajectory of the following vehicle, and automatic control of the following vehicle along the desired trajectory is activated if the trajectory similarity exceeds a particular value.

According to the disclosed embodiments, "trajectory" denotes a movement path along which one of the vehicles involved can travel. "Trajectory" can be understood as meaning movement paths which have actually been travelled and planned movement paths. The trajectory can be of any desired length; for example, it may comprise a route section on a road or a longer route between two geographical positions.

According to the disclosed embodiments, "trajectory similarity" denotes a measure which quantitatively indicates the degree of similarity of two or more trajectories. A higher value of the trajectory similarity may represent greater similarity in this case. It is therefore possible to determine whether trajectories compared with one another substantially match one another or how greatly they differ from one another. For example, the distance between the trajectories, in particular their minimum and maximum distance, can be taken into account in this case. Direction changes along the trajectories to be compared can also be taken into account, for instance by considering the first derivative of the trajectories, with the result that trajectories running in a parallel manner, for example, can be assessed to be more similar than those with a very different course.

According to the disclosed embodiments, redundancy may be achieved by virtue of the desired trajectory produced for the following vehicle being compared with the actual trajectory travelled by the leading vehicle. The desired trajectory of the following vehicle is automatically produced by a journey planner of the following vehicle. Automatic control of the following vehicle is enabled only when it has previously been ensured that the planned desired trajectory or a sufficiently similar actual trajectory has already been previously driven on by the leading vehicle. Since it generally cannot be assumed that the desired trajectory and the actual trajectory are exactly identical, a trajectory comparison is carried out and a particular threshold value for the similarity of the trajectories is required.

In at least one disclosed embodiment of the method, the actual trajectory of the leading vehicle is captured by sensors of the following vehicle. As a result, the sensor system of the following vehicle can be used to capture the actual trajectory of the leading vehicle.

It is possible to resort to a number of sensors already typically present in modern vehicles, for example, image-processing systems, radar or lidar sensors, ultrasonic sensors and/or further sensor systems. In addition to capturing the actual trajectory of the leading vehicle, these sensors can also be used for automatic control and to produce the desired trajectory of the following vehicle.

In one development, image data are captured by the sensors of the following vehicle. As a result, data which can be visually captured can be used to capture the actual trajectory of the leading vehicle and/or to produce the desired trajectory of the following vehicle.

Image data can be captured by means of a camera system which captures data which can be visually captured, including cameras for the infrared range or for other wavelength ranges of light. This also makes it possible to capture image data at night or in poor visibility conditions. Image data typically have a high degree of complexity and a high information density. The image data may capture traffic structures and/or traffic signs and the image data may also be evaluated by an image processing and recognition system. For example, traffic announcements or traffic regulations, for instance as a result of traffic signs, can be recognized and taken into account. A recognition quality which indicates the certainty with which the image data have been correctly recognized and interpreted is quantified in this case.

In another disclosed embodiment, the leading vehicle and/or the following vehicle is/are controlled in such a manner that their distance with respect to one another is less than or equal to the visual range. As a result, it is possible to capture the actual trajectory of the leading vehicle by means of the following vehicle, for example, on the basis of visual data, for instance from a camera system.

To control the distance between the leading vehicle and the following vehicle, it is possible to use, inter alia, distance control methods which are known per se. In this case, the system can be designed in such a manner that the distance is controlled solely by the following vehicle, in which case the leading vehicle does not take into account the distance to the following vehicle. Furthermore, the distance can be alternatively or additionally controlled by the leading vehicle, the leading vehicle having a capture apparatus for capturing the position of the following vehicle in this case.

The visual range is determined by various parameters, in particular climatic conditions, for instance fog, the route course which has a bend or a crest for instance, and the surrounding traffic, in the case of which other road users between the leading vehicle and the following vehicle, for example, can interrupt the visual connection.

The visual range can first of all be determined by sensors, for instance by optical sensors. This makes it possible to detect, for example, climatic influences such as fog in the air. It is also possible to access data from other devices, for instance a database which provides data from weather stations or similar information. It is also possible to detect vehicles which can limit the visual range. The route course can also be analyzed, for example, to evaluate the influence of bend shapes or the height profile on the visual range. In a further operation, the following vehicle is then automatically controlled, for example, in such a manner that the distance to the leading vehicle is less than the visual range.

The method can be designed in such a manner that a threshold value is determined for the duration of an interruption in the visual connection, in which case the captured actual trajectory of the leading vehicle can be extrapolated for a particular duration of the interrupted visual connection.

In another disclosed embodiment, data relating to the actual trajectory of the leading vehicle are captured by the leading vehicle and are transmitted to the following vehicle by means of a data connection. This makes it possible to capture the actual trajectory by means of the following vehicle even if the capture cannot be carried out using the sensor system of the following vehicle.

In this manner, the following vehicle can capture the actual trajectory without the need for a visual connection to the leading vehicle. The data captured by the leading vehicle relating to its own actual trajectory can also be used in this case in addition to the data captured by the sensors of the following vehicle. A satellite-based system, for instance, can be used to capture the actual trajectory by means of the leading vehicle, but it is also possible to use other positioning and route determination methods which are known per se.

In one development, the data connection is established by an external server. As a result, the data to be transmitted can be managed by the external server.

The connection to the external server may be effected via a computer network, for instance the Internet. In this case, the data relating to the actual trajectory of the leading vehicle can also be transmitted to a plurality of following vehicles. Furthermore, a bidirectional connection can be provided between the leading vehicle and the following vehicle, for example, to request the data relating to the actual trajectory of the leading vehicle. The external server can also fulfill a buffer function, with the result that there is no need for a permanent data connection between the leading vehicle and the following vehicle.

When assessing the actual trajectory, it is possible to take into account how great the spatial distance and/or the temporal interval is between the leading vehicle and the following vehicle. The further in the past the driving of the actual trajectory by the leading vehicle, the lower the assessment of the significance for assessing the desired trajectory of the following vehicle.

In one development, the leading vehicle is guided automatically. This makes it possible to achieve a high degree of automation in both vehicles.

The leading vehicle can also be guided in a partially automatic manner, in particular, individual driving maneuvers, for instance the compliance with a particular distance to other road users, being carried out by automatic systems, for example, while a driver, for instance, has control over the guidance of the vehicle.

The leading vehicle comprises a leading vehicle journey planner which produces the actual trajectory. Situations, the actual trajectory of the leading vehicle and the desired trajectory of the following vehicle may already have a high degree of similarity because they are produced by structurally identical or similar journey planners. Differences between the actual trajectory and the desired trajectory may arise in this case, for example, because other devices of the leading vehicle or of the following vehicle detect conditions which suggest that it is necessary to change the trajectory, for instance a changing traffic situation, for instance as a result of other road users.

In another disclosed embodiment, the leading vehicle is guided manually by a leading vehicle driver. As a result, a human driver makes a decision on the journey of the leading vehicle.

The leading vehicle driver guides the leading vehicle along a trajectory which is also suitable, in principle, for automatic control of the following vehicle. The leading vehicle driver is in the leading vehicle, but the leading vehicle can also be guided by means of remote control in a manner known per se.

In another disclosed embodiment, if the trajectory similarity does not exceed the particular value, a safe driving mode of the following vehicle is activated. This means that the following vehicle is safely guided on a trajectory which is unsuitable for automatic control, for example, on a trajectory, the drivability of which has not yet been confirmed by the leading vehicle.

The trajectory similarity cannot exceed the particular value, for example, when changes have arisen since the actual trajectory was driven on by the leading vehicle, which changes suggest that automatic driving by the following vehicle is unfavorable. This may be, for example, an appearance of other road users or may be registered by a different assessment of the situation by the following vehicle.

In another disclosed embodiment, if the safe driving mode of the following vehicle is activated, manual control of the following vehicle by a following vehicle driver is activated or an automatic operation of stopping the following vehicle is carried out. As a result, it is still possible to ensure safe operation of the vehicle when automatic control is no longer safely possible.

The speed of the vehicle can be reduced when changing to the safe driving mode. Furthermore, a driver of the following vehicle can be notified or activated and can assume manual control of the following vehicle, the driver being able to be situated in the following vehicle or the following vehicle being able to be remotely controlled. It is also possible to provide systems in the following vehicle which stop the following vehicle at a suitable location if manual control is not carried out.

In another disclosed embodiment, the automatic control of the following vehicle comprises control of the movement of the following vehicle in the longitudinal and transverse directions. This makes it possible to control the direction and speed of the following vehicle along a trajectory.

In another disclosed embodiment of the method, a reliability value is determined by the leading vehicle, the reliability value is transmitted to the following vehicle and the automatic control of the following vehicle is also activated on the basis of the reliability value. This makes it possible to take into account how the leading vehicle assesses the actual trajectory driven on by it.

According to the disclosed embodiments, the reliability value quantifies the safety of the actual trajectory driven on by the leading vehicle. When driving on the actual trajectory or when producing the actual trajectory, the leading vehicle can determine a reliability value such that uncertainties which occur, for instance, are therefore assessed. If an image capture and processing system, for example, is used in the leading vehicle, it is possible to determine in this case the accuracy with which the capture takes place. This can result, for example, in less automated control of the leading vehicle being activated. This information can be transmitted to the following vehicle.

In the disclosed system for automatically controlling a following vehicle using a leading vehicle, the leading vehicle comprises a leading vehicle control device which can guide the leading vehicle along an actual trajectory. The following vehicle comprises a capture device which can capture the actual trajectory of the leading vehicle. The following vehicle also comprises a following vehicle journey planner which can produce a desired trajectory for the following vehicle, and a following vehicle control device which can control the following vehicle along the desired trajectory. In this case, a trajectory similarity can be determined by comparing the captured actual trajectory of the leading vehicle and the produced desired trajectory of the following vehicle. Furthermore, automatic control of the following vehicle along the desired trajectory can be activated if the trajectory similarity exceeds a particular value.

The disclosed system is designed to implement the method described above. The disclosed system has the same benefits as the disclosed method.

In another disclosed embodiment of the system, the capture unit of the following vehicle comprises sensors, and image data can be captured by the sensors. This makes it possible to capture the actual trajectory of the leading vehicle using the following vehicle's own sensors.

In another disclosed embodiment, data relating to the actual trajectory of the leading vehicle can be captured by the leading vehicle, and a data connection at least temporarily exists between the leading vehicle and the following vehicle. In this case, the data relating to the actual trajectory can be transmitted to the following vehicle. As a result, the capture of the actual trajectory can be supplemented with the data from the leading vehicle or can be completely captured by means of these data. The data connection is established via an external server. The data relating to the actual trajectory can be captured by the leading vehicle using a satellite-based positioning system or using other positioning systems which are known per se.

An exemplary embodiment of the disclosed system and of the disclosed method is explained with reference to FIGS. 1 and 2.

A leading vehicle 1 moves along an actual trajectory 201 in the direction of travel F on a route section 200. A following vehicle 2 travels in the same direction of travel F behind the leading vehicle 1. In this case, the following vehicle 2 comprises a capture unit 25 which in turn comprises sensors 21. It also comprises a journey planner 22. The journey planner 22 and the capture unit 25 are coupled to a control unit 23.

In the example illustrated, the following vehicle 2 is guided in such a manner that the distance between leading vehicle 1 and the following vehicle 2 is less than the visual range. In the exemplary embodiment, the visual range is determined by the sensors 21 of the following vehicle 2 which detect optical properties of the air and detect vehicles in the environment of the following vehicle 2 and of the leading vehicle 1 and track their movement. The journey planner 22 of the following vehicle 2 may also access a database which provides information relating to the course of a road network in which the automatic guidance is carried out. It is therefore already determined in an anticipatory manner if tight bends or a hilltop threaten(s) to interrupt the visual connection between the following vehicle 2 and the leading vehicle 1. The distance can be reduced in this case, or it is possible to analyze how long the interruption will presumably last.

When carrying out the disclosed method, the journey planner 22 first of all produces a desired trajectory 204 for continuing the journey of the following vehicle 2. The actual trajectory 201 of the leading vehicle 1 is captured by the sensors 21 of the capture unit 25 of the following vehicle 2, in particular by optical and radar and lidar sensors, and is compared with the desired trajectory 204 produced for the following vehicle 2. This comparison is carried out by means of a comparison unit included in the control unit 23. In this case, a trajectory similarity, for which a particular threshold value is defined, is determined.

The trajectory similarity quantifies the differences between the compared trajectories and its value is higher, the more similar the trajectories are. The trajectory comparison can be carried out in various ways; spatial distances of the trajectories with respect to one another can be quantified and the course of the trajectories can be compared on the basis of their derivative. Furthermore, determined differences can be considered with a different weighting in each case; for example, sudden direction changes can be considered with a particularly high weighting, whereas more minor evasive maneuvers can have a lower weighting. Further data beyond the mere trajectories can also be taken into account when producing the trajectory similarity, for example, by the systems for producing the trajectories.

If a comparison of the determined trajectory similarity with the defined threshold value determined that there is a sufficiently high degree of similarity of the compared trajectories, automatic control of the following vehicle 2 along the desired trajectory 204 is activated. In this case, the control unit 23 of the following vehicle 2 assumes control of the following vehicle 2 in the longitudinal and transverse directions. This is carried out on the basis of data captured by the capture unit 25, for instance information relating to positions and the movement of other road users, the road course, obstacles on the road and traffic law restrictions such as speed restrictions or overtaking bans.

Otherwise, that is to say if the threshold value is not reached, automatic control is not carried out, but rather a safe driving mode for the following vehicle 2 is activated and a driver assumes manual guidance. When changing to the safe driving mode, the speed of the following vehicle 2 is reduced and the driver is activated, for example, by outputting an acoustic and/or visual warning signal which indicates to the driver in the following vehicle 2 that he should assume control of the following vehicle 2. Whereas the driver of the following vehicle 2 can deal with other tasks during the automatic guidance of the following vehicle 2, he now assumes control manually. In this case, the manual control can nevertheless be assisted by various assistance systems, for example, a lane-keeping assistant, adaptive cruise control and/or a lane-change assistant. Furthermore, a particular period is provided for the transition from the automatic control to the manual control in the exemplary embodiment, the following vehicle 2 being stopped at a suitable location when the driver does not assume control within the particular transition period.

In another exemplary embodiment, the driver of the following vehicle 2 is not situated in the following vehicle 2, but rather remote control is carried out.

Another exemplary embodiment of the system is explained with reference to FIG. 3. The situation explained above with reference to FIG. 1 is likewise assumed here.

Figure 2:
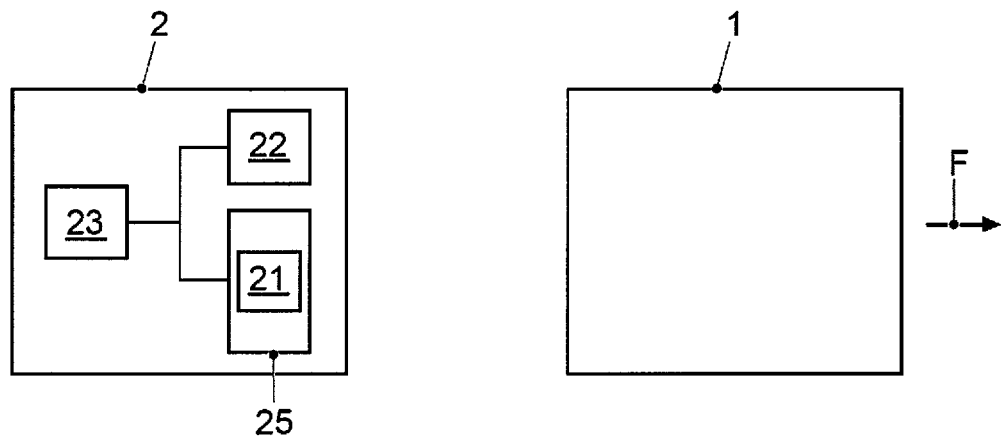
FIG. 2 shows an exemplary embodiment of the disclosed system.

This exemplary embodiment is a modification of the system illustrated in FIG. 2, in which case communication between the leading vehicle 1 and the following vehicle 2 is provided.

In this exemplary embodiment, the actual trajectory of the leading vehicle 1 is captured by virtue of the following vehicle 2 receiving data from the leading vehicle 1. In a similar manner to that in the situation described with reference to FIG. 2, the following vehicle 2 comprises a control unit 23 to which a journey planner 22 and a capture unit 25 containing sensors 21 are coupled. A data interface 20 is also coupled to the control unit 23 and at least temporarily establishes a data connection to an external server 3. The external server 3 is referred to as a center 3 below since it undertakes the task of a central management unit.

In the exemplary embodiment, the leading vehicle 1 likewise comprises a control unit 13 to which a journey planner 12 and a capture unit 15 containing sensors 11 are coupled. The sensors 11 of the leading vehicle 1 comprise sensors for receiving signals from a satellite-based positioning system. A data interface 10 is also coupled to the control unit 13 of the leading vehicle 1 and can at least temporarily establish a data connection to the center 3.

The data connection to the center 3, both from the data interface 20 of the following vehicle 2 and from the data interface 10 of the leading vehicle 1, can be effected wirelessly, for example, by means of a local area network or a larger network, for example, the Internet. Furthermore, the connection can be established via a telecommunications network, for instance a telephone network, or a wireless local area network (WLAN). The data connection can also be established by another unit which itself can establish a connection to the center 3. For example, a mobile telephone can be connected to the data interface 10 of the leading vehicle 1 or to the data interface 20 of the following vehicle 2, for instance by means of a data cable or a radio connection, for instance by means of Bluetooth, and can provide the connection to the center 3.

The capture unit 15 containing the sensors 11 of the leading vehicle 1 now captures the actual trajectory 201 of the leading vehicle 1. In the example illustrated, this takes place using a satellite-based positioning system, for instance GPS, but the trajectory can be captured in any other manner known per se. Data relating to the actual trajectory 201 are transmitted from the leading vehicle 1 to the following vehicle 2 via the center 3. The data transmitted in the described manner can be used as an alternative or in addition to data captured by the capture unit 25 containing the sensors 22 of the following vehicle 2. For example, a comparison of the actual trajectory 201 observed by the following vehicle 2 and the actual trajectory 201 captured by the leading vehicle 1 can be evaluated. These data ideally match.

Like in the situation explained with reference to FIG. 2, the desired trajectory 204 produced for the following vehicle 2 and the captured actual trajectory 201 are now compared, in which case a trajectory similarity is produced and is compared with a defined threshold value. If the trajectory similarity exceeds the threshold value, automatic control of the following vehicle 2 along the desired trajectory 204 is activated in the manner described above.

Figure 3:
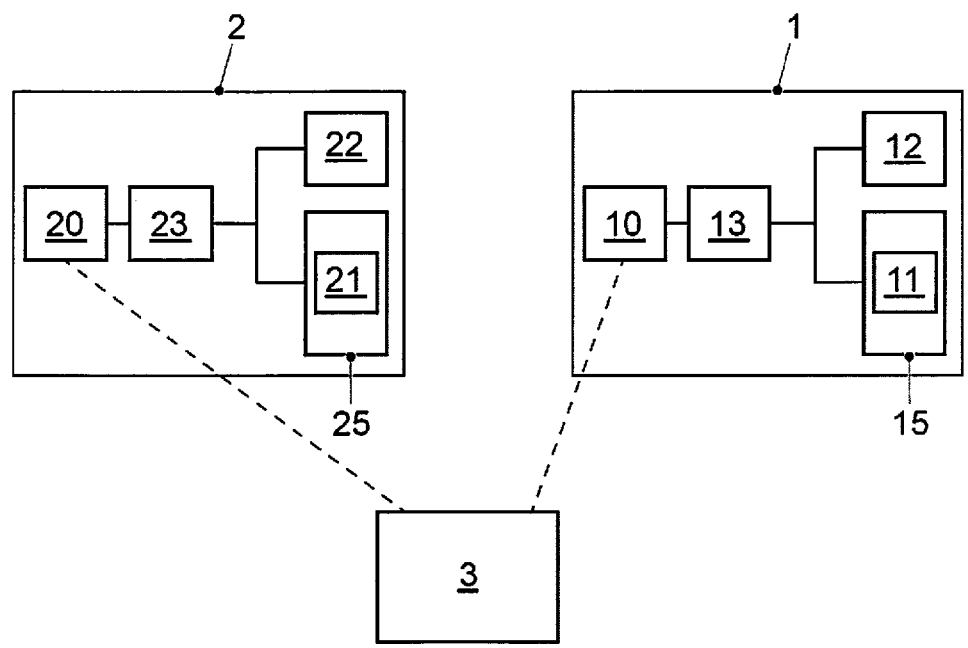
FIG. 3 shows another exemplary embodiment of the disclosed system.

In the exemplary embodiment illustrated in FIG. 3, the leading vehicle 1 also comprises a route planner 12. At least one exemplary embodiment may provide for this route planner 12 to produce the actual trajectory 201 of the leading vehicle 1 and for the leading vehicle 1 to be automatically controlled by its control unit 13. In at least one exemplary embodiment, the leading vehicle 1 itself may in turn play a role comparable to the following vehicle 2, a further vehicle in front of the leading vehicle 1 in the direction of travel F being required in this case.

If the predefined threshold value for the trajectory similarity of the actual trajectory 201 and the desired trajectory 204 is not exceeded in the disclosed method, that is to say if considerable differences between the compared trajectories are detected, a safe driving mode for the following vehicle 2 is activated. As already described above, the speed of the following vehicle 2 is reduced when changing to the safe driving mode and a driver is activated, for instance by means of acoustic and/or visual signals, to manually assume control of the following vehicle 2. In this case, a particular period is provided for the transition from the automatic control to the manual control in the exemplary embodiment, the following vehicle 2 being stopped at a suitable location when the driver does not assume control within the particular transition period.

In another exemplary embodiment, the actual trajectory 201 driven on by the leading vehicle 1 is assessed. Provision is made for a reliability value to be determined when producing the actual trajectory 201 for the leading vehicle 1. This determination is carried out on the basis of the data used to produce the actual trajectory 201 on the basis of the certainty with which image recognition is carried out on the basis of data from the sensors 11 of the leading vehicle 1. It is also possible to provide a human user of the system, for instance a driver in the leading vehicle 1, who assesses the reliability of the actual trajectory 201.

It goes without saying that the exemplary embodiments described above can be used in any desired combinations; it is possible to carry out automatic control of the leading vehicle 1, during which the actual trajectory 201 is produced by the journey planner 12 and the leading vehicle 1 is guided by the control unit 13. It is not necessary in this case for data relating to the actual trajectory 201 of the leading vehicle 1, to be transmitted to the following vehicle 2.

As can be discerned in the exemplary embodiments explained above, the system allows control of the following vehicle 2 to be automated to a high degree without the need for communication with other devices.

LIST OF REFERENCE SYMBOLS

1 Leading vehicle
2 Following vehicle
3 External server; center
10 Data interface (leading vehicle)
11 Sensors (leading vehicle)
12 Journey planner (leading vehicle)
13 Control unit (leading vehicle)
15 Capture unit (leading vehicle)
20 Data interface (following vehicle)
21 Sensors (following vehicle)
22 Journey planner (following vehicle)
23 Control unit (following vehicle)
25 Capture unit (following vehicle)
200 Route section
201 Actual trajectory of the leading vehicle
204 Desired trajectory of the following vehicle
F Direction of travel

The invention claimed is:

1. A method for automatically controlling a following vehicle, the method comprising:
producing a desired trajectory for the following vehicle;
capturing, by the following vehicle, an actual trajectory indicative of a movement path which has been actually travelled by the leading vehicle;
determining a trajectory similarity by comparing the captured actual trajectory of the leading vehicle and the produced desired trajectory of the following vehicle;
determining whether the leading vehicle has travelled the desired trajectory based on the trajectory similarity, including determining whether the trajectory similarity exceeds a threshold value of similarity between the actual trajectory of the leading vehicle and the desired trajectory of the following vehicle; and
activating, in response to determining that the leading vehicle has travelled the desired trajectory, automatic control of the following vehicle to follow the leading vehicle by travelling along the desired trajectory.

2. The method of claim 1, wherein the actual trajectory of the leading vehicle is captured by sensors of the following vehicle.

3. The method of claim 2, wherein image data are captured by the sensors of the following vehicle.

4. The method of claim 1, wherein at least one of the leading vehicle and the following vehicle is controlled so that their distance with respect to one another is less than or equal to a visual range determined by one or more sensors of the following vehicle.

5. The method of claim 1, wherein data relating to the actual trajectory of the leading vehicle are captured by the leading vehicle and are transmitted to the following vehicle by a data connection.

6. The method of claim 5, wherein the data connection is established by an external server.

7. The method of claim 1, wherein the leading vehicle is guided automatically.

8. The method of claim 1, wherein the leading vehicle is guided manually by a leading vehicle driver.

9. The method of claim 1, wherein, in response to a determination that the trajectory similarity does not exceed the particular value, a safe driving mode of the following vehicle is activated.

10. The method of claim 9, wherein, in response to a activation of the safe driving mode of the following vehicle, manual control of the following vehicle by a following vehicle driver is activated or an automatic operation of stopping the following vehicle is carried out.

11. The method of claim 1, wherein the automatic control of the following vehicle comprises control of the movement of the following vehicle in the longitudinal and transverse directions.

12. The method of claim 1, further comprising:
determining a reliability value by the leading vehicle;
transmitting the reliability value to the following vehicle; and
activating the automatic control of the following vehicle based on the reliability value.

13. The method of claim 1, wherein the desired trajectory of the following vehicle is automatically produced by a journey planner of the following vehicle.

14. A system for automatically controlling a following vehicle using a leading vehicle,
the following vehicle comprising:
a capture device which captures an actual trajectory indicative of a movement path which has been actually travelled by the leading vehicle, and
a following vehicle control device configured to produce a desired trajectory for the following vehicle and to control the following vehicle along the desired trajectory,
wherein the following vehicle control device is configured to determine a trajectory similarity by comparing the captured actual trajectory of the leading vehicle with the produced desired trajectory of the following vehicle, and to determine whether the leading vehicle has travelled the desired trajectory by determining whether the trajectory similarity exceeds a threshold value of similarity between the actual trajectory of the leading vehicle and the desired trajectory of the following vehicle, and
wherein the following vehicle control device is configured to activate automatic control of the following vehicle to follow the leading vehicle by travelling along the desired trajectory in response to affirmative determination that the leading vehicle has travelled the desired trajectory based on the trajectory similarity.

15. The system of claim 14, wherein the capture device of the following vehicle comprises sensors, and image data is captured by the sensors.

16. The system of claim 14, wherein data relating to the actual trajectory of the leading vehicle is captured by the leading vehicle, a data connection at least temporarily exists between the leading vehicle and the following vehicle, and the data relating to the actual trajectory is transmitted to the following vehicle.

* * * * *